C. F. WALL.
AUTOMATIC GRAIN UNLOADER AND ELEVATOR.
APPLICATION FILED AUG. 16, 1912.

1,062,205.

Patented May 20, 1913.
6 SHEETS—SHEET 1.

C. F. WALL.
AUTOMATIC GRAIN UNLOADER AND ELEVATOR.
APPLICATION FILED AUG. 16, 1912.

1,062,205.

Patented May 20, 1913.
6 SHEETS—SHEET 2.

Witnesses:—
J. P. Wahler
Francis Boyle

Inventor,
C. F. Wall.
By
Chandler & Chandler
Attorneys

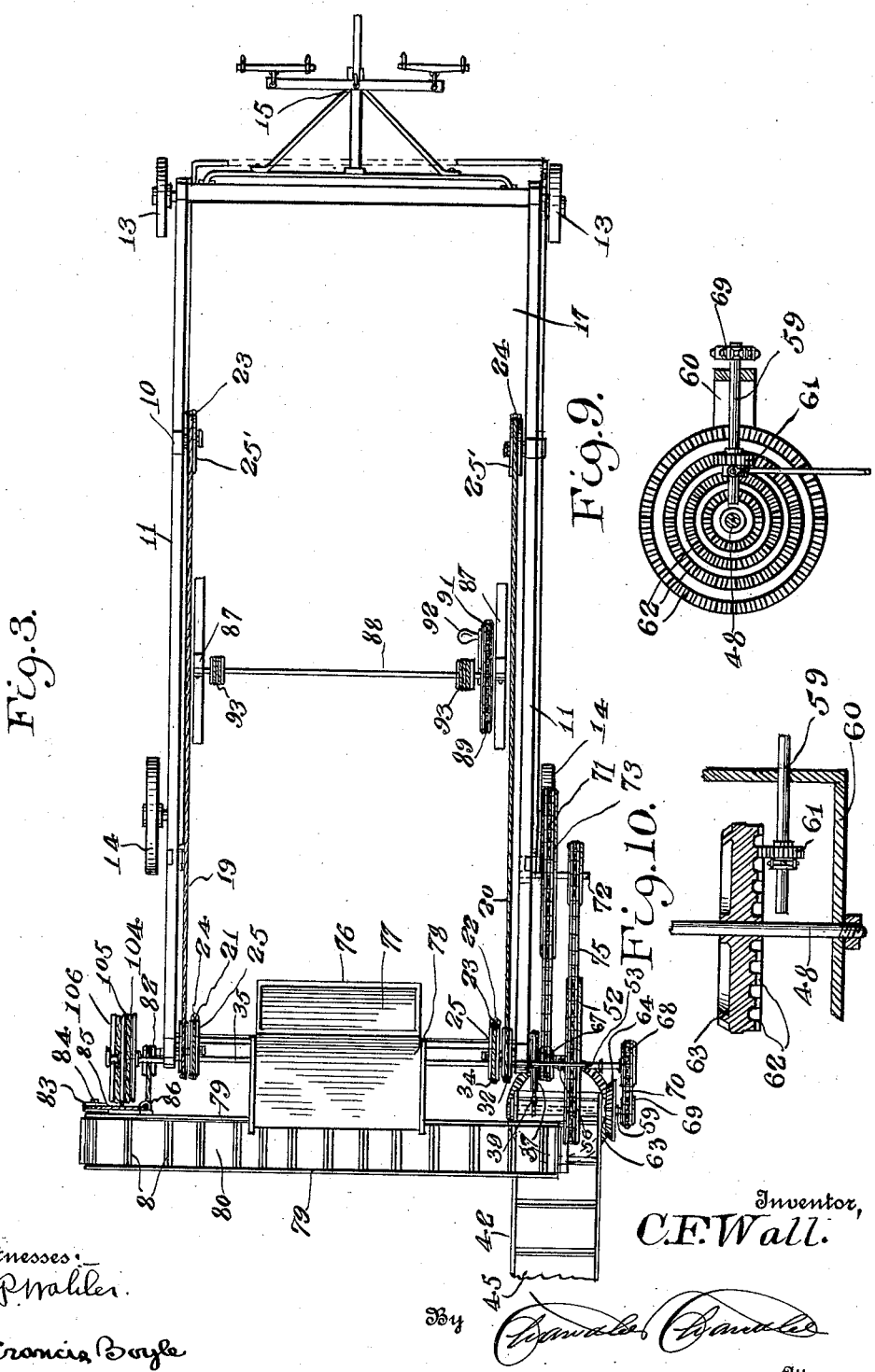

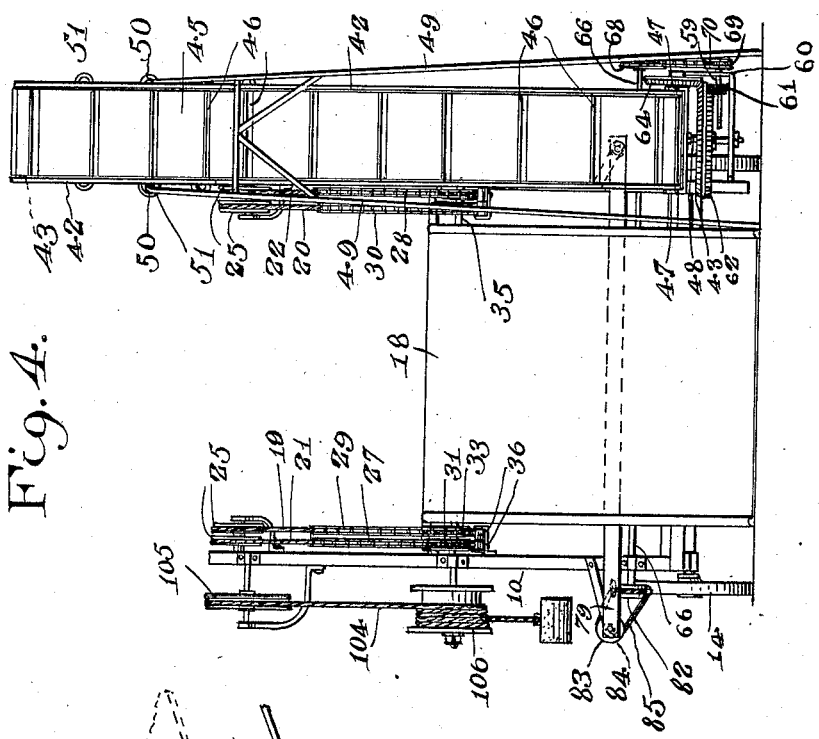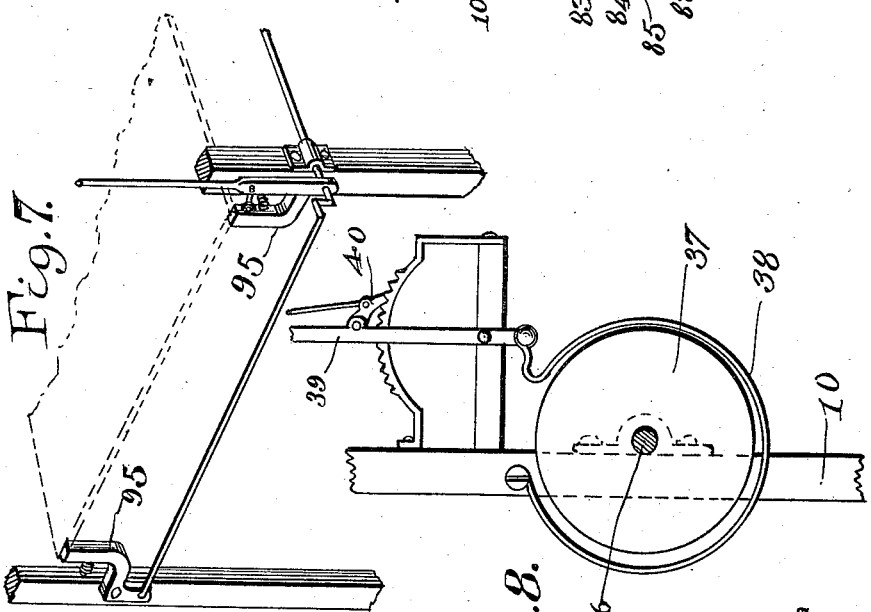

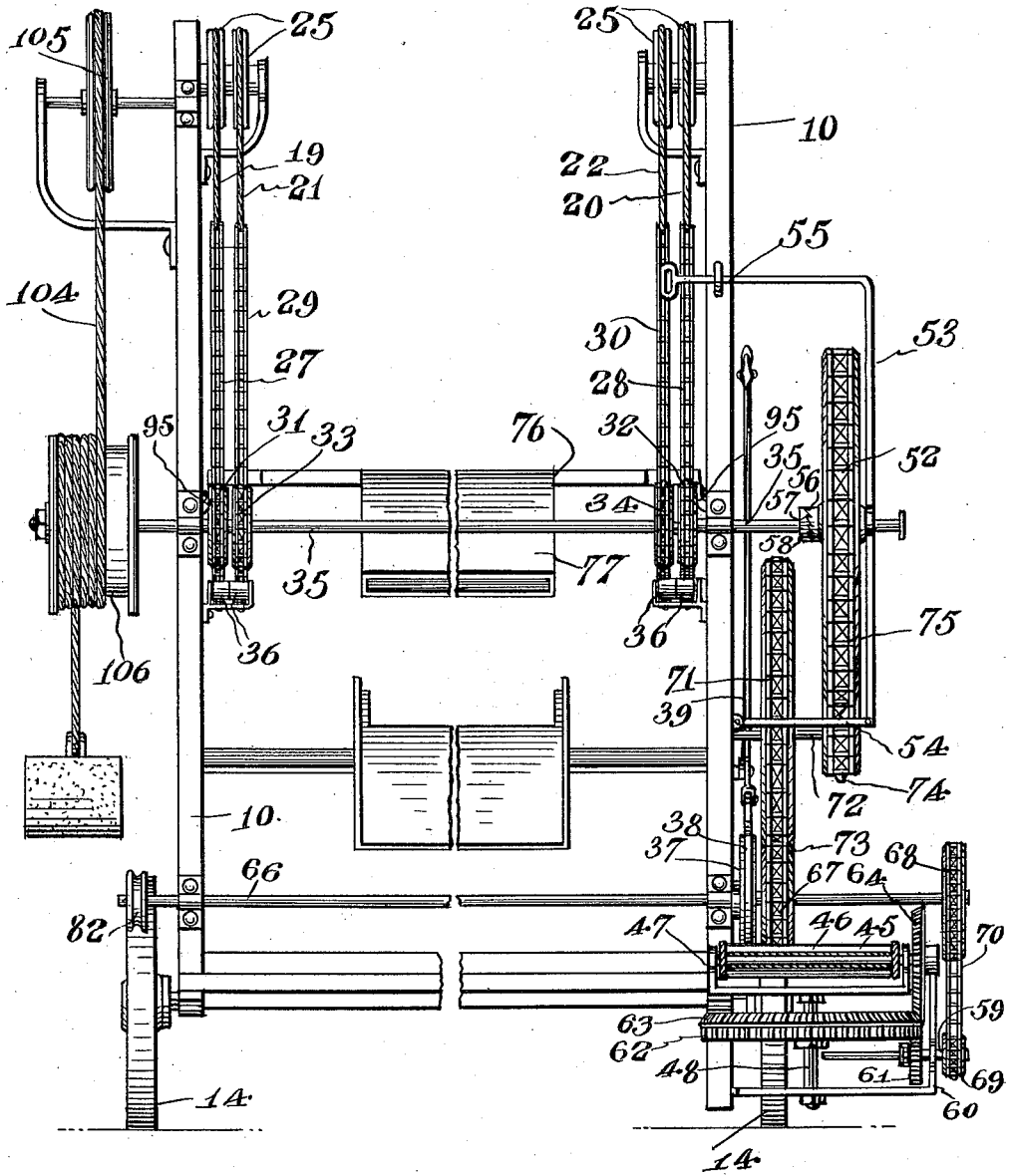

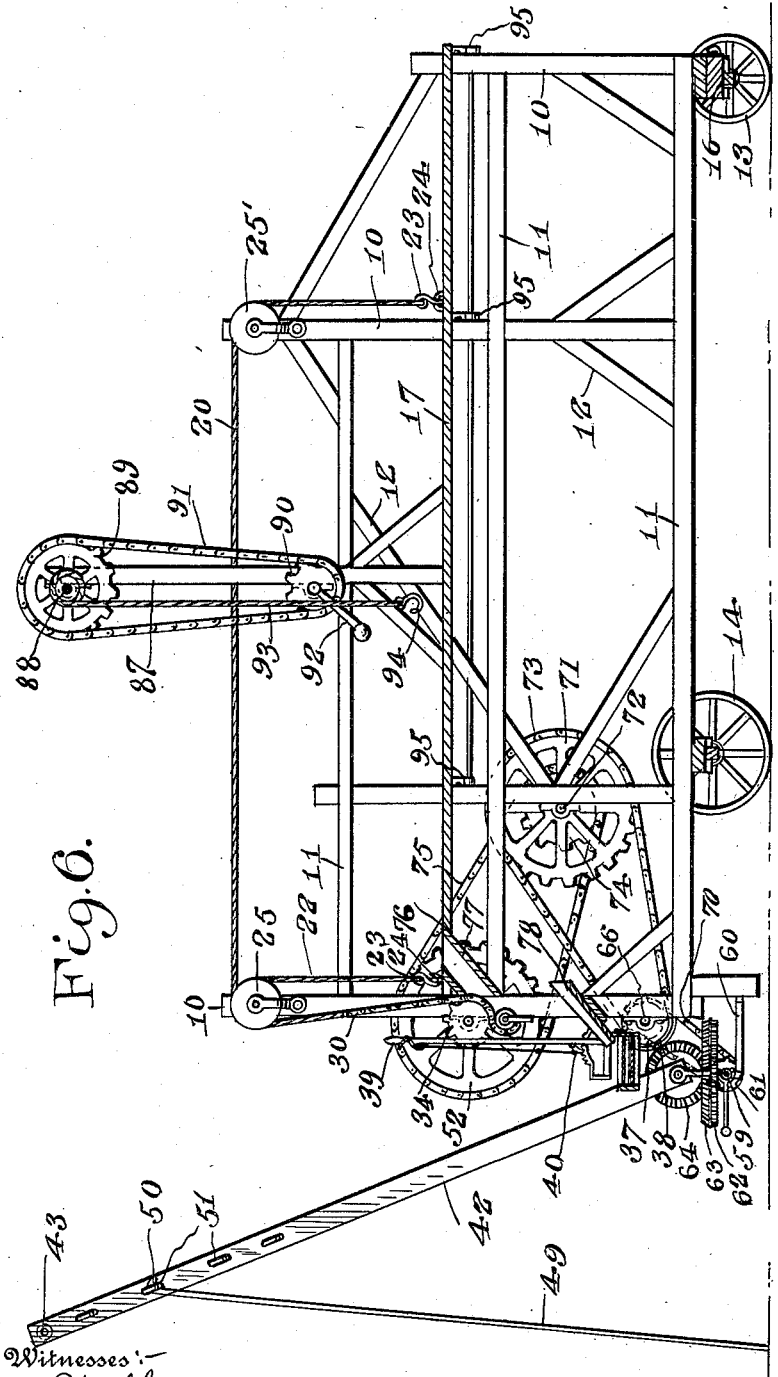

UNITED STATES PATENT OFFICE.

CLARENCE F. WALL, OF HOLTON, KANSAS.

AUTOMATIC GRAIN UNLOADER AND ELEVATOR.

1,062,205.  Specification of Letters Patent.  Patented May 20, 1913.

Application filed August 16, 1912. Serial No. 715,492.

*To all whom it may concern:*

Be it known that I, CLARENCE F. WALL, a citizen of the United States, residing at Holton, in the county of Jackson, State of Kansas, have invented certain new and useful Improvements in Automatic Grain Unloaders and Elevators; and I do hereby declare the following to be a full, clear, and exact description of the invention, such as will enable others skilled in the art to which it appertains to make and use the same.

This invention relates to portable grain dumping and elevating machines of that general character so arranged that the contents of the wagon may be dumped and elevated into a suitable bin or the like.

An object of the present invention is to provide a vertically movable platform adapted to be lowered by the weight of the draft animals and loaded wagon and to actuate the elevator mechanism during such lowering movement, means being provided for manually tilting the wagon to dump the same into the elevator mechanism during sinking of the platform.

A further object of the invention is to provide means for returning the platform to raised position after each operation, and also to provide means for automatically locking the platform in raised position while the loaded wagon and draft animals are advancing thereon.

A still further object of the invention is to provide novel supporting cables for the platform, these cables being operatively connected to the driving mechanism of the endless elevator and serving to actuate the latter during sinking of the platform.

With the above objects in view the invention consists of certain novel details of construction and combination of parts hereinafter fully described and claimed, it being understood that various modifications may be made in the minor details of construction within the scope of the appended claims.

Figure 1:
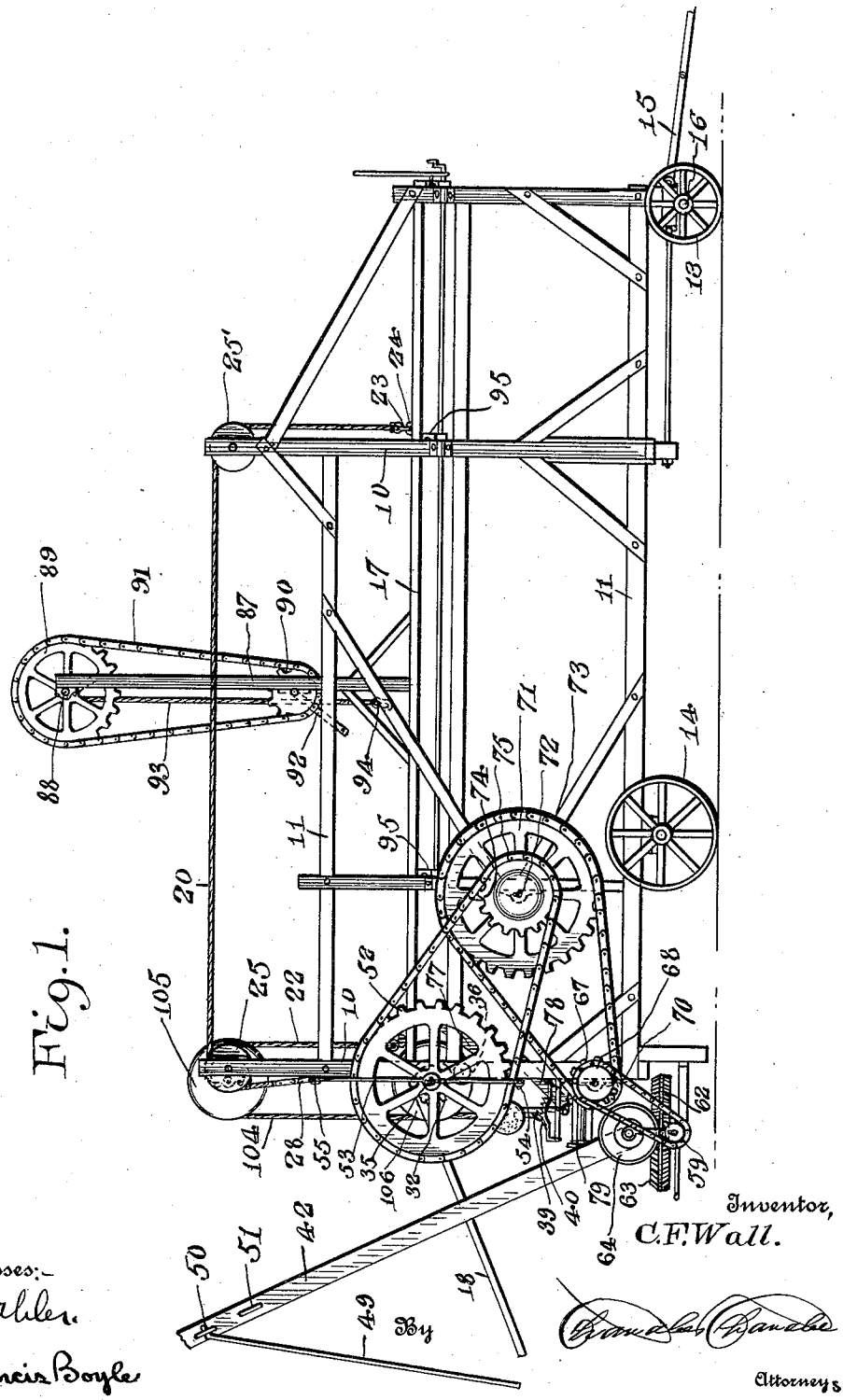
Figure 2:
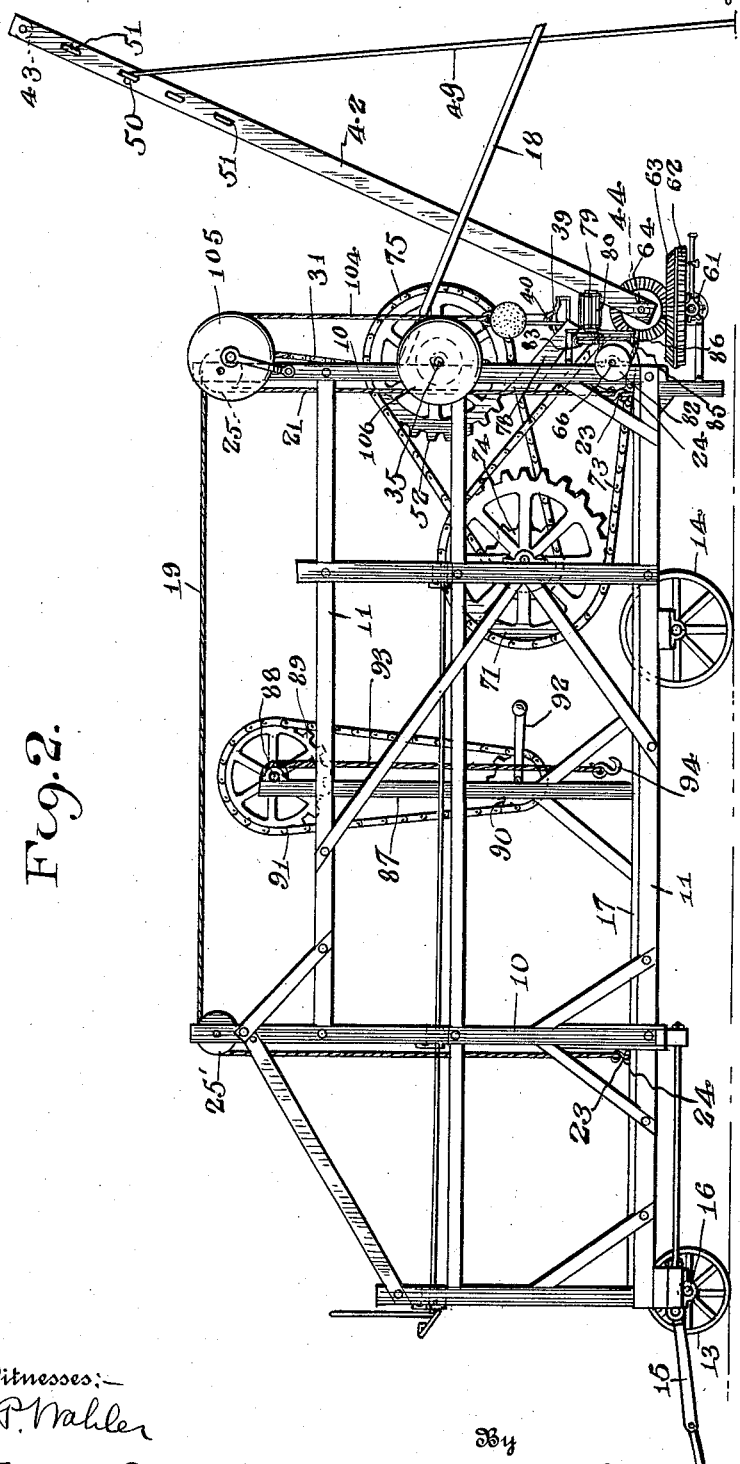

In the accompanying drawings forming part of this specification:—Figure 1 is a side elevation of the device with the platform in raised position. Fig. 2 is a side elevation of the reverse side of the device from that shown in Fig. 1 and showing the platform in lowered position. Fig. 3 is a plan view of the device. Fig. 4 is an end elevation of the device looking toward the approach and elevator. Fig. 5 is an enlarged end elevation of the device with the approach and elevator removed. Fig. 6 is a longitudinal sectional view taken on the line 6—6 Fig. 3. Fig. 7 is a detail perspective view showing the platform supporting posts and means carried thereby for locking the platform in raised position. Fig. 8 is a fragmentary vertical sectional view taken on the line 8—8 Fig. 5. Fig. 9 is an underneath plan view of the chain speed gear mechanism. Fig. 10 is a cross sectional view through the parts shown in Fig. 9.

Referring now to the drawings in which like characters of reference designate similar parts, the device is shown to comprise a frame including a plurality of posts 10 connected by longitudinal rails 11, the posts being suitably braced by inclined braces 12 secured to the rails. The frame is supported upon front and rear ground wheels 13 and 14 and is equipped with a draft tongue 15 which is suitably connected to the dirigible axle 16 of the front wheels.

A vertically movable platform 17 is mounted between the posts of the frame and is equipped at the rear end with a hinged approach 18 which forms an inclined runway up which the draft animals and loaded wagon may advance on to the platform 17. The platform is supported by means of four cables 19, 20, 21 and 22. The cables are terminally equipped with hooks 23 which engage in eye bolts 24 carried by the platform, the cables 19 and 20 being trained over loose pulleys 25 carried by a pair of the posts 10 near the rear end of the machine and being further trained over loose pulleys 25' carried by a pair of the posts at the front end of the machine, while the cables 21 and 22 are trained only over the pulleys 25. The cables terminate in sprocket chains 27, 28, 29 and 30 remote from the hooks, these sprocket chains being trained under sprocket gears 31, 32, 33 and 34 carried by a shaft 35 which is journaled for rotation in the said rear posts, there being idlers 36 carried by these posts and bearing against the chains to hold the same in mesh with their respective sprocket gears.

The weight of the loaded wagon and team causes the platform to sink with a resultant travel of the cables over their respective supporting pulleys and a resultant upward movement bodily of the sprocket chain, the shaft 35 being rotated by such movements of the chains. The shaft 35 is a driving shaft for the elevator mechanism, and in order to govern the speed of this shaft a brake wheel 37 is fixed to the shaft and over this wheel is engaged a band brake 38 which is secured at one end to one of the rear posts 10 and is secured at the other end to an operating lever 39 having a pawl connection 40 with a rack 41 carried by the rear post.

The elevator comprises side bars 42 between the upper and lower ends of which rollers 43 and 44 are journaled, an endless web 45 being trained over these rollers and being equipped with flights 46. A yoke 47 is secured to the lower ends of the side bars and is equipped with a pin 48 which is fixed to the extremity of one of the lower longitudinal rails 11. The elevator is supported in raised position by means of a ladder designated in general by the numeral 49, the ladder being terminally equipped with hooks 50 which are adapted to be selectively engaged in a series of eyes 51 on the elevator side bars 42 to vary the inclination of the elevator.

For actuating the elevator a loose gear 52 on the driving shaft 35 is provided with a shifting rod 53 which is pivoted on a bracket arm 54 and is actuated by a push rod 55. The gear is equipped with a ratchet face 56 adapted to mesh with a similar ratchet face 57 on a clutch 58 fixed to the driving shaft 35. Through a suitable power transmission mechanism hereinafter described the gear 52 rotates a stub shaft 59 which is journaled in a bracket arm 60 carried below the lower end of the elevator, this stub shaft being equipped with a bevel pinion 61 adapted to mesh selectively with concentric gear teeth 62 on the bottom face of a bevel gear 63 which meshes with a bevel gear 64 carried by the shaft 65 of the lower roller 44 of the endless elevator. By shifting the stub shaft the endless web 45 is actuated at various speeds.

Included in the power transmission mechanism above referred to is a shaft 66 which is journaled in the rear posts 10 below and parallel with the driving shaft 35 and is equipped at one end with spaced gears 67 and 68. Over the gear 68 and the gear 69 on the stub shaft 59 is trained a sprocket chain 70. Over the gear 67 and a gear 71 carried upon a stub shaft 72 is trained a sprocket gear 73. Over the clutch controlled driving gear 52 and a pinion 74 carried by the stub shaft 72 is trained a sprocket chain 75. The endless elevator is actuated through the instrumentality of the transmission mechanism above described during sinking of the platform, the driving gear 52 being clutched to the driving shaft prior to such sinking of the platform.

Formed in the rear end of the platform is a dumping opening 76 which communicates with a downwardly inclined chute 77. A stationary trough 78 carried by the frame of the machine below the discharge end of the chute communicates with an endless carrier carried by the frame, the endless carrier comprising side bars 79 between which an endless web 80 provided with flights 81 works. The above described shaft 66 actuates the endless carrier to carry the material gravitating from the trough to the elevator, and to attain this end a pulley 82 is fixed to the said shaft 66 and over this pulley and a pulley 83 carried by one of the rollers 84 of the endless carrier web a belt 85 is trained, the intermediate portion of the belt being trained through belt guides 86 to maintain the belt in proper position.

For manually elevating the front end of the loaded wagon to dump the contents out of the rear end of the wagon on to the chute 77, a pair of uprights 87 are fixed to the platform and a shaft 88 is journaled in the upper ends of the uprights, the shaft being equipped with an actuating sprocket gear 89 over which and a pinion 90 is trained a sprocket chain 91, the pinion being actuated through the instrumentality of a crank handle 92 to rotate the shaft 88. A pair of cables 93 are fixed to the shaft and are equipped at the lower ends with hooks 94 adapted to be hooked around the front axle of the wagon. By rotating the crank handle the cables may be wound upon the shaft with a resultant elevation of the front end of the wagon to facilitate the material gravitating from the rear end of the wagon to the chute.

In order to lock the platform in raised position to receive the loaded wagon and draft animals prior to the unloading operation, a pair of the posts 10 on each side of the frame is equipped with locking means comprising a catch 95 which is pivoted at the lower end to the related post as shown at 96 and is adapted to be normally held upright in engagement with the underneath face of the platform by means of a helical spring 97 interposed between the catch and related post. A bell crank lever 98 is pivoted at the elbow on the post and is connected to the free end of the catch by a rock link 99. The free legs of both bell crank levers on the same side of the machine are connected by a rod 100. Both rods terminate in crank arms 101 which are connected by a rod 102. An operating lever 103 is pivotally connected to the frame of the machine and is connected to one of the crank arms 101. Upon actuation of the operating lever all of the catches will be simultaneously rocked outwardly from engagement with the platform thereby freeing the platform for sinking movement due to the weight of the loaded wagon and draft animals.

When the platform has sunk to its lowest limit of movement and the wagon has been unloaded and the material elevated by the elevator, the wagon is advanced off from the platform. To automatically return the platform to raised position a cable 104 is trained over a loose pulley 105 carried by one of the rear posts 10 and is provided at one end with a weight of greater weight than the platform. The opposite end of the cable is connected to a drum 106 which is fixed to the driving shaft 35. When the wagon has advanced off from the platform, the push rod is actuated to release the gear 52 from the driving shaft and the driving shaft is then free to be rotated by gravitation of the weight and unwinding of the cable from the drum, the shaft serving to rotate the gears 30, 31, 32, 33 and 34 in a counter direction to the direction of rotation during sinking of the platform with a resultant raising of the platform through the instrumentality of the cables thereof being taken up through the instrumentality of the sprocket chain connections of these cables with the above mentioned gears.

What is claimed, is:—

1. In an unloading and elevating machine, a vertically movable platform, an elevator, means actuated by sinking of the platform for actuating said elevator, means for yieldably holding said platform in raised position, and means for automatically returning said platform to raised position after the platform arrives at its lowest limit of movement.

2. In an unloading and elevating machine, a vertically movable platform, an elevator, a revoluble shaft, supporting cables carried by said platform adapted to actuate said shaft upon sinking movement of said platform, means carried by said shaft for actuating said elevator, means for yieldably holding said platform in raised position, and a counterbalancing weight operatively connected to said shaft for rotating said shaft and returning said platform to raised position after the platform arrives at its lowest limit of movement.

3. In an unloading and elevating machine, a supporting frame, a vertically movable platform carried by said frame, a shaft carried by said frame, gears on said shaft, cables secured to said platform, sprocket chains on said cables held permanently in mesh with said gears, said cables actuating said shaft upon sinking movement of said platform, an elevator, clutch controlled means actuated by said shaft during sinking movement of said platform and actuating said elevator, a drum fixed on said shaft, a cable carried by said drum, and a counterbalancing weight on said cable serving to rotate said shaft and elevate said platform to raised position after the platform arrives at its lowest limit of movement.

In testimony whereof, I affix my signature, in presence of two witnesses.

CLARENCE F. WALL.

Witnesses:
M. A. BENDER,
GEO. H. BARKER.

Copies of this patent may be obtained for five cents each, by addressing the "Commissioner of Patents, Washington, D. C."